(12) United States Patent
Callahan

(10) Patent No.: US 10,071,784 B2
(45) Date of Patent: Sep. 11, 2018

(54) BICYCLE FRAME WITH CHAIN STAY CHAMBER

(71) Applicant: BCycle, LLC, Waterloo, WI (US)

(72) Inventor: Ryan Callahan, Madison, WI (US)

(73) Assignee: B-Cycle LLC, Waterloo, WI (US)

( * ) Notice: Subject to any disclaimer, the term of this patent is extended or adjusted under 35 U.S.C. 154(b) by 0 days.

(21) Appl. No.: 15/219,274

(22) Filed: Jul. 25, 2016

(65) Prior Publication Data

US 2017/0166279 A1   Jun. 15, 2017

Related U.S. Application Data

(60) Provisional application No. 62/196,411, filed on Jul. 24, 2015.

(51) Int. Cl.
*B62J 13/04* (2006.01)
*B62K 19/44* (2006.01)
*B62K 3/06* (2006.01)

(52) U.S. Cl.
CPC .............. *B62K 19/44* (2013.01); *B62K 3/06* (2013.01); *B62J 13/04* (2013.01)

(58) Field of Classification Search
CPC .. B62K 19/44; B62K 3/06; B62J 13/00; B62J 13/02; B62J 13/04; B62J 13/06

USPC ............................ 474/146; 280/152.2, 288.4
See application file for complete search history.

(56) References Cited

U.S. PATENT DOCUMENTS

| | | | | |
|---|---|---|---|---|
| 610,313 A * | 9/1898 | Waters | ..................... | B62J 13/00 474/147 |
| 611,750 A * | 10/1898 | Fulford | .................... | B62J 13/00 474/147 |
| 613,469 A * | 11/1898 | Ramsey | .................... | B62J 13/00 474/147 |
| 659,235 A * | 10/1900 | Jeffery | ..................... | B62J 13/00 474/147 |
| 952,647 A * | 3/1910 | Sorensen | ................. | B62J 13/00 474/145 |
| 3,724,582 A * | 4/1973 | Wood | ....................... | B62J 13/04 180/219 |
| 2003/0224891 A1* | 12/2003 | Chou | ....................... | B62J 13/00 474/146 |
| 2009/0197725 A1* | 8/2009 | Chuang | .................... | B62J 13/02 474/144 |

* cited by examiner

*Primary Examiner* — Tony H Winner

(57) ABSTRACT

An apparatus including a bicycle frame including a drive side chain stay. The drive side chain stay can include a drive side chain stay chamber, an inside chain stay cutout, an outside chain stay cutout; and a dropout. The drive side chain stay can be configured such that a chain of a bicycle including the bicycle frame can be inserted through the inside chain stay cutout, the drive side chain stay chamber, and the outside chain stay cutout without breaking the chain.

14 Claims, 6 Drawing Sheets

BICYCLE FRAME WITH CHAIN STAY CHAMBER

CROSS REFERENCE TO RELATED APPLICATIONS

This application claims the benefit of U.S. Provisional Application No. 62/196,411, filed on Jul. 24, 2015, titled Bicycle Frame with Drive Side Seat [sic] Stay Chamber, which is incorporated herein by reference in its entirety.

BACKGROUND

The present invention relates generally to the field of bicycle frames and more particularly to the field of bicycle frames with fleet maintenance features.

A typical bicycle includes a seat tube, a chain stay and a seat stay which are connected together in a triangle. In the typical bicycle, a chain must be broken in order to install the chain through the triangle because the chain must be connected to a cassette, which is on one side (the inside) of the triangle, and the chain ring, which is on the other side (the outside) of the triangle. Thus, a mechanic must spend time to break and assemble chains when serving the chain. Consequently, improved chain maintenance configurations are needed.

SUMMARY

One illustrative embodiment is related to an apparatus including a bicycle frame including a drive side chain stay. The drive side chain stay can include a drive side chain stay chamber, an inside chain stay cutout, an outside chain stay cutout; and a dropout. The drive side chain stay can be configured such that a chain of a bicycle including the bicycle frame can be inserted through the inside chain stay cutout, the drive side chain stay chamber, and the outside chain stay cutout without breaking the chain.

Another illustrative embodiment is related to a bicycle including a bicycle frame including a drive side chain stay. The drive side chain stay can include a drive side chain stay chamber, an inside chain stay cutout, an outside chain stay cutout; and a dropout. The drive side chain stay can be configured such that a chain of a bicycle including the bicycle frame can be inserted through the inside chain stay cutout, the drive side chain stay chamber, and the outside chain stay cutout without breaking the chain.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

Figure 1:
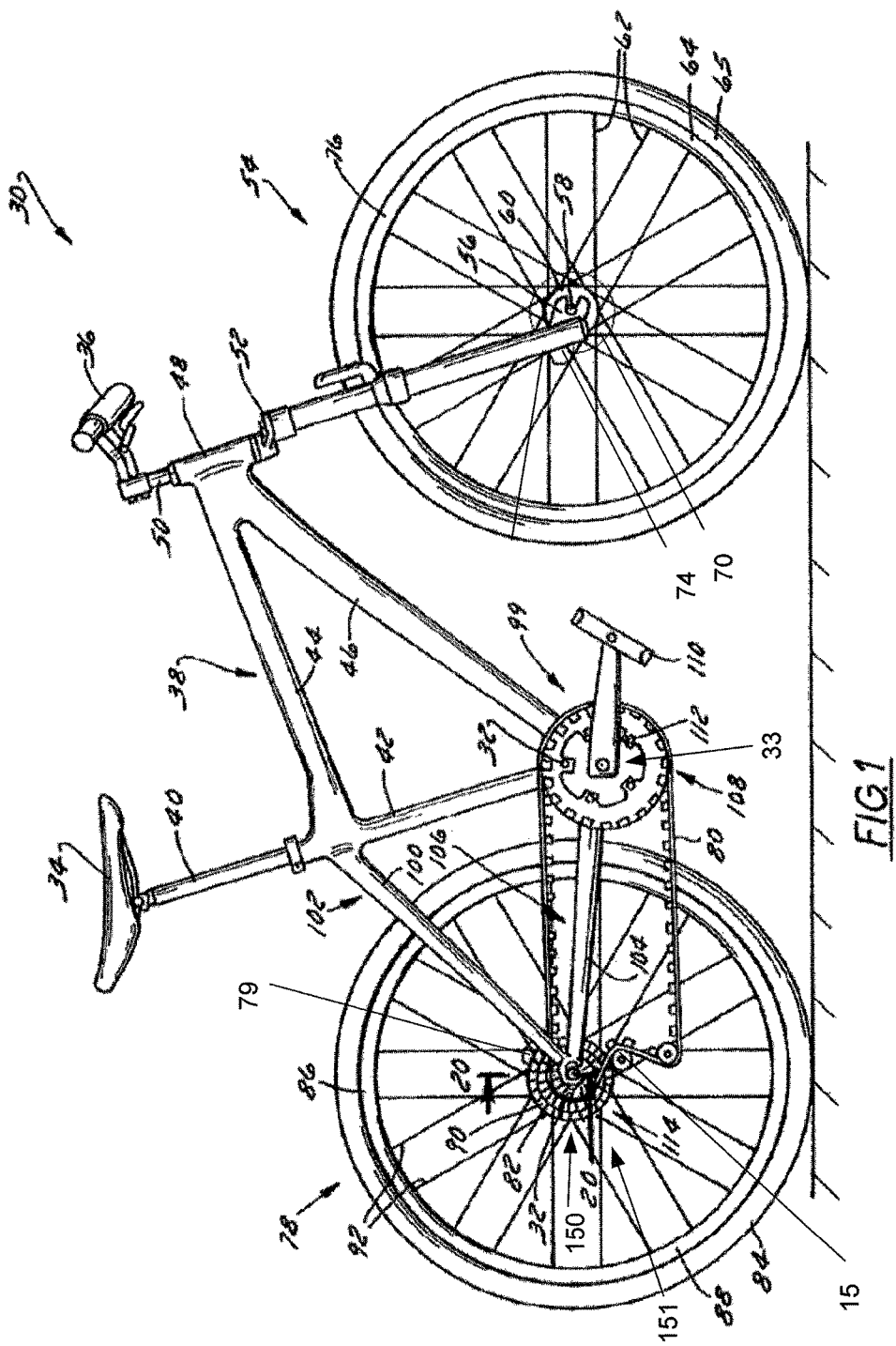
FIG. 1 is a side view of a bicycle in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a bicycle frame including a chain stay chamber for routing a chain and a bicycle including the bicycle frame. FIG. 1 shows a bicycle 30 including a chain stay chamber for routing a chain. Bicycle 30 can include a seat 34 and handlebars 36 that are attached to a frame assembly 38 of bicycle 30. A seat post 40 can be connected to seat 34 and can slidably engage a seat tube 42 of frame assembly 38. A top tube 44 and a down tube 46 can extend forwardly from seat tube 42 to a head tube 48 of frame assembly 38. Handlebars 36 can be connected to a stem 50 that passes through head tube 48 and engages a fork crown 52.

A pair of fork blades 53 extend from generally opposite ends of fork crown 52 and are constructed to support a front wheel assembly 54 at an end of each fork or a fork tip 56. Fork tips 56 engage generally opposite sides of an axle 58 that supports a hub 60 of front wheel assembly 54. A number of spokes 62 extend from hub 60 to a rim 64 of front wheel assembly 54. A tire 65 is engaged with rim 64 such that rotation of tire 65, relative to forks 53, rotates rim 64 and hub 60.

Bicycle 30 can include a front brake assembly 70 having an actuator 72 attached to handlebars 36 and a caliper 74 positioned on a rotor 73. Caliper 74 is constructed to engage the rotor 73, which is attached to front wheel assembly 54, thereby providing a stopping or slowing force to front wheel assembly 54. A rear wheel assembly 78 can include a similar caliper 79 positioned on a rotor (not shown) although either of front and/or rear wheel assemblies could be provided with rim type braking assemblies. Regardless of the specific configuration of the respective braking system, similar to front wheel assembly 54, rear wheel assembly 78 also can include a skewer, shaft, or axle 82 that secures rear wheel assembly 78 to frame assembly 38 of bicycle 30 via axle mounting 150.

Rear wheel assembly 78 can include a tire 84 that is supported by a wheel 86. Wheel 86 can include a rim 88 that is offset from a hub 90 by a number of spokes 92. Alternatively, wheel 86 could include laterally opposite discs that extend between rim 88 and hub 90. Hub 90 can cooperate with axle 82 such that wheel 86 rotates about an axis of rotation defined by axle 82 relative to frame assembly 38 during use of bicycle 30. Rear wheel assembly 78 and axle 82 can be selectively positioned relative to bicycle 30 to tension a drive member, such as a chain or belt 80 of a drive train 99 of bicycle 30. Drive member 80 can be formed of a chain or fairly robust but pliable material such as reinforced carbon fiber material.

Frame assembly 38 can include a pair of seat stays 100, 102 and a pair of chain stays 104, 106 that offset rear axle 82 from a crankset 108 of bicycle 30. As described further below, stays 100, 102, 104, 106 can be oriented to generally flank rear wheel assembly 78. Seat stays 100, 102 and chain stays 104, 106 can be positioned on and support the generally laterally opposite sides axle 82 of wheel assembly 78. In other embodiments, a single chain stay and a single seat stay of robust construction could be provided such that wheel assembly 78 could be mounted in a lateral cantilevered fashion relative thereto. Chain stay 106 can include a chain stay chamber for routing chain/belt 80 from crankset 108 to cassette 114 without breaking the chain/belt 80.

Crankset 108 can include a set of pedals 110 that are operationally connected to chain/belt 80 via a drive member such as a chain ring, sprocket or drive cog 112. Crankset 108 can be attached to the frame by bottom bracket 33. Although crankset 108 is shown as having only one sprocket 112, it is envisioned that crankset 108 can include more than one sprocket having an alternate operating diameter thereby increasing the gearing ratios that can be achieved with drive train 99. Rotation of chain/belt 80 communicates a drive force to a rear section or driven sprocket(s), element(s), pulley(s), gear(s), or cog(s) that, in a multi-ratio free-wheel capable configuration, is commonly referred to as a cassette 114. Rotation of chain/belt 80 drives cassette 114 which is turn rotates rear wheel assembly 78 so as to propel bicycle 30 in a forward direction. A derailleur 15 can control the position of the chain/belt 80 on the cassette 114.

Crankset 108 and cassette 114 can each include one or more variable diameter drive members or cogs so that drive train 99 can be operated at a number of gearing ratios. The construction of the drive train members or cogs can vary as a function of the type of chain or flexible drive 80. That is, the construction and operation of the drive train members associated with crankset 108 and/or cassette 114 when flexible drive 80 is provided as a belt can be different than those used with drive train systems equipped with a chain. Regardless of the specific material and/or shape of the construction of the chain or flexible drive member, the drive train members or cogs can mate with the flexible drive member in a manner such that the flexible drive member includes a projecting or male structure that interfering cooperates with a cavity or female structure associated with each of respective cog. Such differences are readily appreciated. The axle mounting 150 can be used with belt and/or chain, single and multiple driven member crankset and wheel cassettes, bicycle drive train systems.

Regardless of the specific modality of flexible drive 80 and the driving arrangement for interacting with the flexible drive 80, forward rotation or clockwise operation (when viewed from a right hand of lateral drive side of bicycle 30) of drive cog 112 can interact with at least one driven cog associated with rear wheel assembly 78 or a cassette 114 to rotate wheel 86 in a clockwise or forward driving direction. Cassette 114 can be generally concentrically orientated with respect to rear axle 82. Cassette 114 can be operationally connected to hub 90 of a rear wheel 86 of rear wheel assembly 78. Rider operation of pedals 110 powers drive train 99 to drive belt 80 and thereby drive rear wheel 86 which in turn propels bicycle 30. Alternatively, a motor can be used to power drive train 99. In other embodiments, rather than being provided with a free-wheel configuration, it is envisioned that one or more cogs as disclosed below can be directly to secured to hub 90 of rear wheel 86 to impart the driving force thereto.

Figure 2:
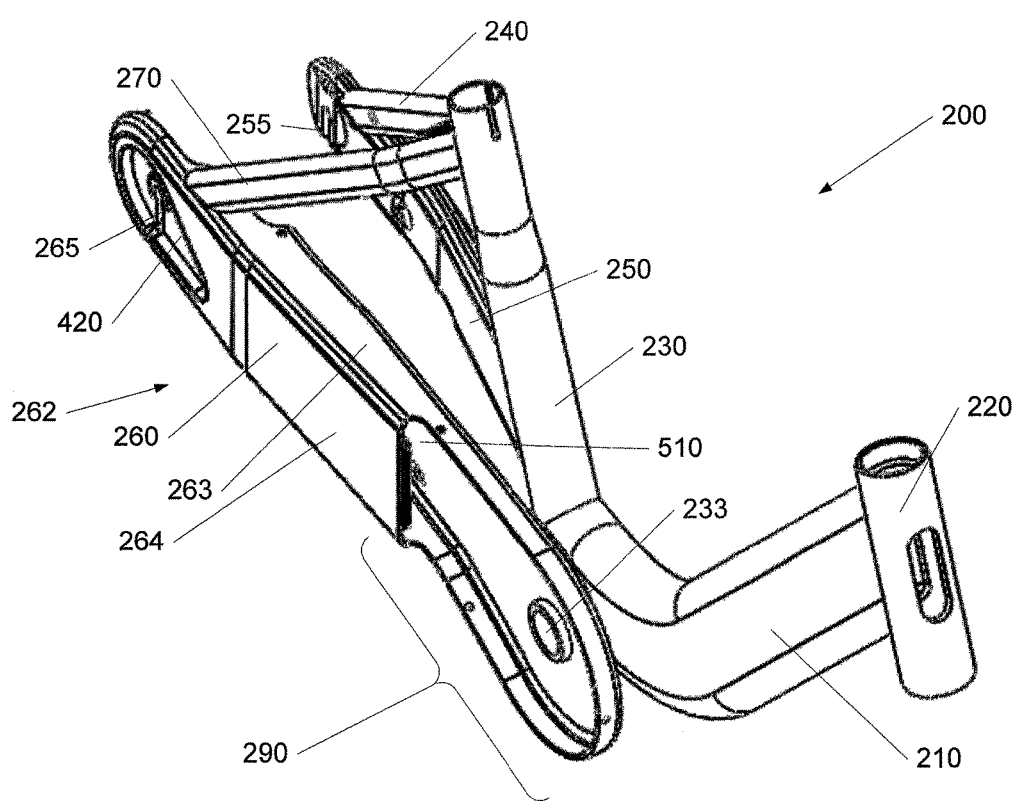
FIG. 2 is a front perspective view of a bicycle frame in accordance with an illustrative embodiment.
Figure 3:
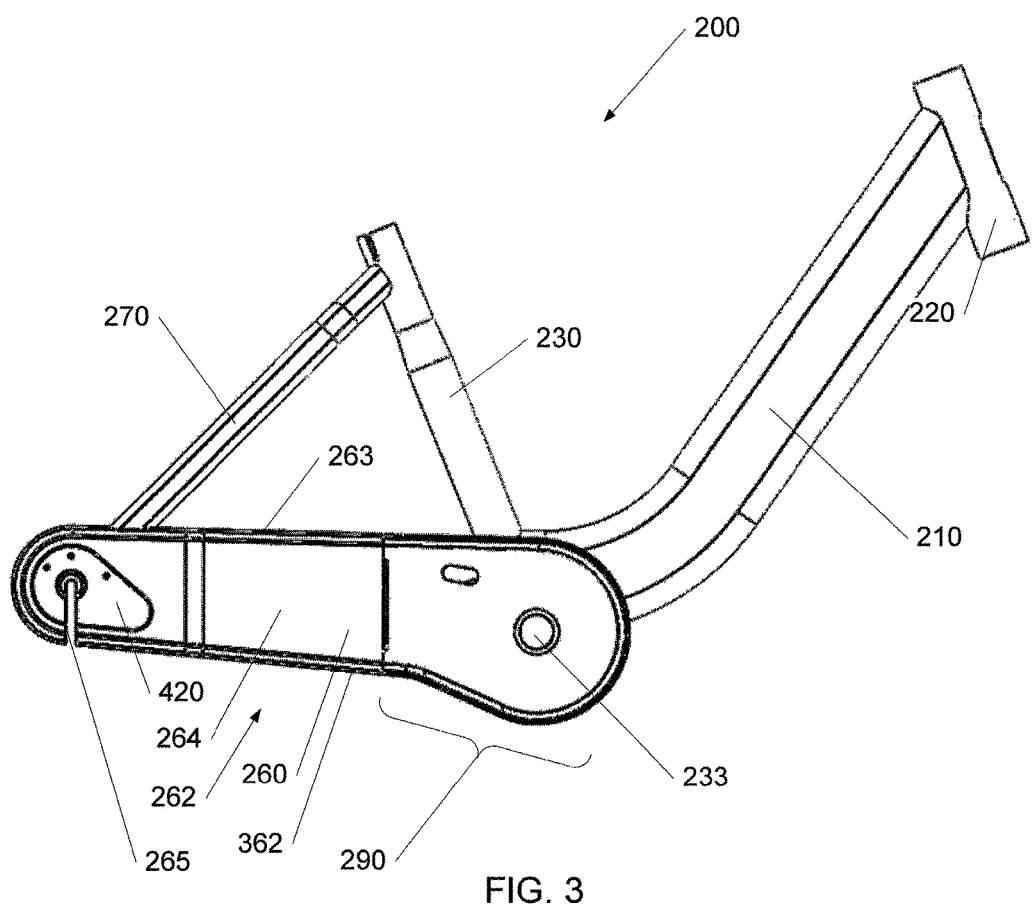
FIG. 3 is a side view of the bicycle frame of FIG. 2 in accordance with an illustrative embodiment.
Figure 4:
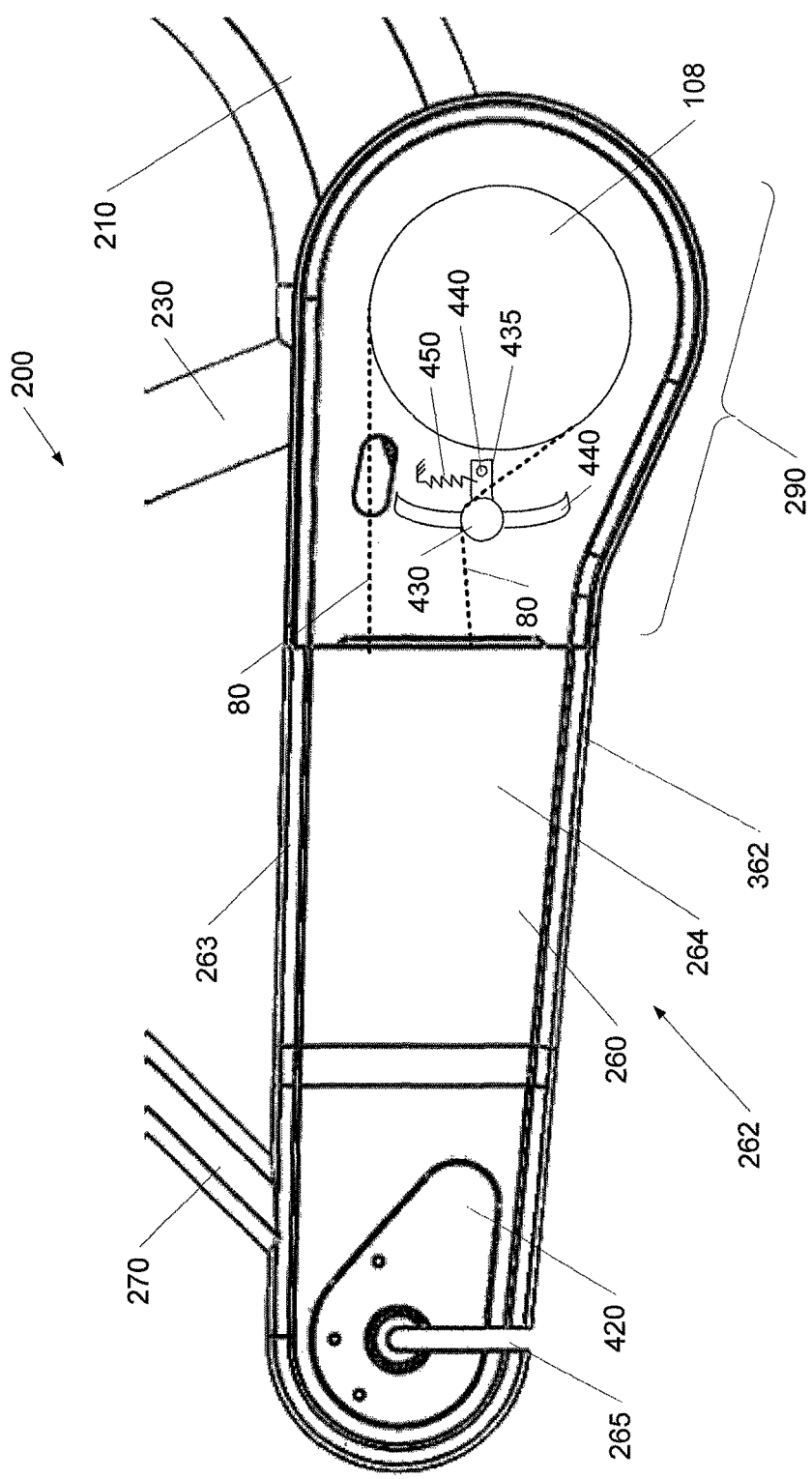
FIG. 4 is a side detail view of the bicycle frame of FIG. 2 in accordance with an illustrative embodiment.
Figure 5:
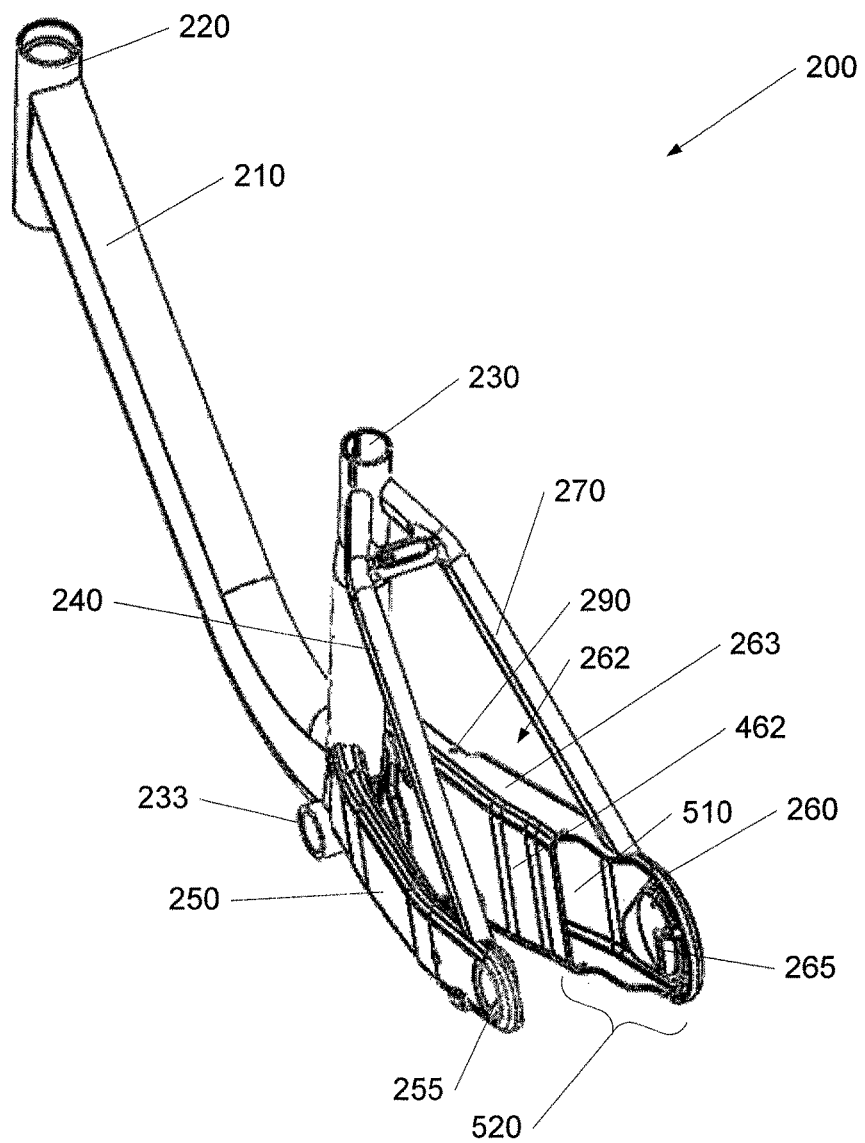
FIG. 5 is a rear perspective view of the bicycle frame of FIG. 2 in accordance with an illustrative embodiment.
Figure 6:
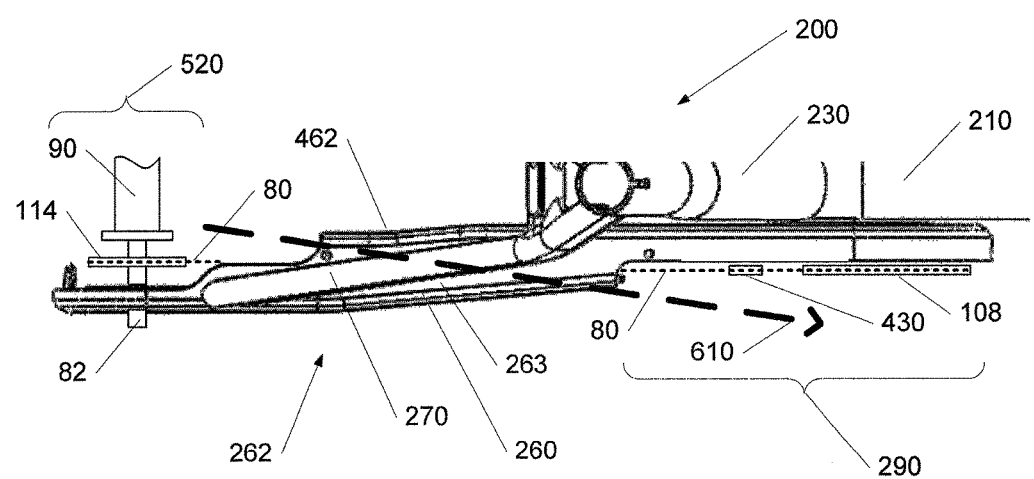
FIG. 6 is a top detail view of the bicycle frame of FIG. 2 in accordance with an illustrative embodiment.

Referring now to FIG. 2, a front perspective view of a bicycle frame 200 in accordance with an illustrative embodiment is shown. Referring to FIG. 3, a side view of the bicycle frame 200 of FIG. 2 in accordance with an illustrative embodiment is shown. Referring to FIG. 4, a side detail view of the bicycle frame 200 of FIG. 2 in accordance with an illustrative embodiment is shown. Referring to FIG. 5, a rear perspective view of the bicycle frame 200 of FIG. 2 in accordance with an illustrative embodiment is shown. Referring to FIG. 6, a top detail view of the bicycle frame 200 of FIG. 2 in accordance with an illustrative embodiment is shown.

The bicycle frame 200 can include a down tube 210, a head tube 220, a seat tube 230, bottom bracket 233, a non-drive side seat stay 240, a non-drive side seat stay 250, a non-drive side dropout 255, a drive side chain stay 260, a drive side dropout 265, and a drive side seat stay 270. The down tube 210, head tube 220, seat tube 230, bottom bracket 233, non-drive side seat stay 240, non-drive side seat stay 250, non-drive side dropout 255, drive side chain stay 260, drive side dropout 265, and drive side seat stay 270 can be configured as noted above.

The drive side chain stay 260 can include a drive side chain stay structure 262. The drive side chain stay structure 262 can include a top side 263, an outside 264, a bottom 362, and an inside 462. The top side 263, an outside side 264, a bottom 362, and an inside side 462 can form a chamber 510 through which a chain or belt 80 can be routed without breaking a loop of the chain or belt 80. An outside chain stay cut out 290 can be located on a front end of the drive side chain stay 260 towards the head tube 220 and face toward an outside of the bike (i.e., away from the non-drive side dropout 255). An inside chain stay cut out 520 can be located on a rear end of the drive side chain stay 260 towards the dropouts 265, 255 and face toward an inside of the bike (i.e., towards the non-drive side dropout 255). Thus, the chain or belt 80, when inserted, can extend from the outside chain stay cut out 290 on the outside of the bicycle frame 200 to the inside chain stay cut out 520 on the inside of the bicycle frame 200 as shown by arrow 610.

The outside chain stay cut out 290 can expose the crankset 108 of the bicycle. In one embodiment, the outside chain stay cut out 290 can be covered by a shroud (not shown). The inside chain stay cut out 520 can expose the cassette 114. In one embodiment, the inside chain stay cut out 520 can be covered by a shroud (not shown). The drive side chain stay 260 can include a rear axle access port 420 for accessing the rear axle 82. The rear axle access port 420 can be covered by a shroud (not shown). In one embodiment, the chain or belt 80 is at least partially enclosed by the drive side chain stay structure 262. In another, embodiment, the chain or belt 80 is fully enclosed by the drive side chain stay structure 262 and shrouds.

In one embodiment, the drive side chain stay 260 can include a tensioning sprocket 430. The tensioning sprocket 430 can be attached to a tensioning arm 435 that pivots on a pivot 440. A spring 450 can be attached to the tensioning arm 435 and the drive side chain stay structure 262. The tensioning sprocket 430 can travel in a travel slot 440. The tensioning sprocket 430 can tension chain or belt 80. In an alternative embodiment, the chain or belt 80 can be tensioned using only the non-drive side dropout 255 and the drive side dropout 265.

The rear axle 82 can be installed between the non-drive side dropout 255 and the drive side dropout 265. To remove a chain or belt 80, first a mechanic would remove any shrouds. If the chain or belt 80 is tensioned using a tensioning sprocket 430, the chain or belt 80 can be removed from the tensioning sprocket 430. The rear axle 82 can be loosened from the non-drive side dropout 255 and the drive side dropout 265. When the rear axle 82 is slid out of the dropouts 255, 265, the chain or belt 80 can be removed from the cassette 114. The chain or belt 80 can be removed from the crankset 108. Finally, the chain or belt 80 can be removed from the drive side chain stay structure 262, either from the outside chain stay cut out 290 or the inside chain stay cut out 520.

To install a chain or belt 80, the reverse is executed. The mechanic can insert the chain or belt 80, which is in a completely loop, into the drive side chain stay structure 262, either from the outside chain stay cut out 290 or the inside chain stay cut out 520. The chain or belt 80 can be mated to the crankset 108. When the rear axle 82 is slid out of the dropouts 255, 265, the chain or belt 80 can be mated to the cassette 114. The rear axle 82 can be installed into the non-drive side dropout 255 and the drive side dropout 265 and tightened. If the chain or belt 80 is tensioned using a tensioning sprocket 430, the chain or belt 80 can be installed on the tensioning sprocket 430. Finally, a mechanic would install any shrouds.

Advantageously, the chain or belt 80 can be installed or replaced without breaking the chain or belt 80.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus, comprising:
    a bicycle frame including a drive side chain stay, wherein the drive side chain stay comprises:
        a drive side chain stay chamber,
        an inside chain stay cutout,
        an outside chain stay cutout; and
        a dropout;
        configured such that a chain can be inserted through the inside chain stay cutout, the drive side chain stay chamber, and the outside chain stay cutout without breaking the chain.

2. The apparatus of claim 1, further comprising a tensioning sprocket for tensioning the chain.

3. The apparatus of claim 1, wherein the outside chain stay cutout is located at a bottom bracket of the bicycle frame.

4. The apparatus of claim 1, wherein the outside chain stay cutout is configured to expose a crankset of the bicycle, wherein the crankset is configured to drive the chain.

5. The apparatus of claim 1, wherein the inside chain stay cutout is located at an inside side of the dropout of the bicycle frame.

6. The apparatus of claim 1, wherein the inside chain stay cutout is configured to expose a cassette of the bicycle.

7. The apparatus of claim 1, wherein the drive side chain stay chamber includes a top side, an outside side, a bottom, and an inside side.

8. An apparatus, comprising:
  a bicycle including a bicycle frame comprising a drive side chain stay, wherein the drive side chain stay includes:
    a drive side chain stay chamber,
    an inside chain stay cutout,
    an outside chain stay cutout; and
    a dropout;
    configured such that a chain can be inserted through the inside chain stay cutout, the drive side chain stay chamber, and the outside chain stay cutout without breaking the chain.

9. The apparatus of claim 8, further comprising a tensioning sprocket for tensioning the chain.

10. The apparatus of claim 8, wherein the outside chain stay cutout is located at a bottom bracket of the bicycle frame.

11. The apparatus of claim 8, wherein the outside chain stay cutout is configured to expose a crankset of the bicycle, wherein the crankset is configured to drive the chain.

12. The apparatus of claim 8, wherein the inside chain stay cutout is located at an inside side of the dropout of the bicycle frame.

13. The apparatus of claim 8, wherein the inside chain stay cutout is configured to expose a cassette of the bicycle.

14. The apparatus of claim 8, wherein the drive side chain stay chamber includes a top side, an outside side, a bottom, and an inside side.

\* \* \* \* \*